United States Patent [19]

Watts

[11] Patent Number: 5,154,267
[45] Date of Patent: Oct. 13, 1992

[54] BRAKE ACTUATED SHIFT CONTROL FOR MOBILE MACHINES

[75] Inventor: Verne C. Watts, Lisbon, N. Dak.

[73] Assignee: Clark Equipment Company, South Bend, Ind.

[21] Appl. No.: 765,593

[22] Filed: Sep. 26, 1991

[51] Int. Cl.⁵ .............................................. B60K 41/26
[52] U.S. Cl. .................................... 192/4 A; 192/4 R
[58] Field of Search .................. 192/4 R, 4 A, 1.44; 74/846

[56] References Cited

U.S. PATENT DOCUMENTS

| 2,422,909 | 6/1947 | Kangas | 192/1.44 |
|---|---|---|---|
| 2,752,447 | 6/1956 | Shaffer | 192/1.44 X |
| 3,463,277 | 8/1969 | Allori et al. | 192/4 R |
| 3,517,790 | 6/1970 | Damon | 192/4 R |
| 3,605,903 | 9/1971 | Glesmann | 172/3 |
| 3,750,762 | 8/1973 | Eaton | 173/8 |
| 3,845,847 | 11/1974 | Camp | 192/1.44 |
| 3,911,602 | 10/1975 | Trevathan | 37/86 |
| 3,957,143 | 5/1976 | Barth | 192/4 A |
| 4,056,176 | 11/1977 | Forster et al. | 74/846 X |
| 4,084,672 | 4/1978 | Avins | 192/0.055 |
| 4,105,101 | 8/1978 | Forster et al. | 192/4 A |
| 4,227,598 | 10/1980 | Luft | 192/4 A |
| 4,277,898 | 7/1981 | Flippin | 37/86 |
| 4,480,713 | 11/1984 | Macht et al. | 280/268 |
| 4,645,051 | 2/1987 | Maczono et al. | 192/4 A X |
| 4,883,151 | 11/1989 | Tobler | 192/4 A |

FOREIGN PATENT DOCUMENTS

| 0006449 | 1/1986 | Japan | 192/4 A |
|---|---|---|---|
| 0286440 | 11/1990 | Japan | 192/4 A |

Primary Examiner—Rodney H. Bonck
Attorney, Agent, or Firm—Kinney & Lange

[57] ABSTRACT

The present invention relates to a brake actuated shift control for mobile self propelled machines to reduce premature brake wear leading to brake failure caused when a brake is engaged and, during brake engagement, a transmission coupled to the machine transmits power to a coupled drive wheel engaging a surface. The transmission has a plurality of selectable ranges corresponding inversely to a plurality of transmission output torques. A shift actuation control is coupled to the transmission to cause the transmission to shift to a higher range when the brake is applied with the transmission in a low range, so as to reduce the transmission output torque.

7 Claims, 2 Drawing Sheets

BRAKE ACTUATED SHIFT CONTROL FOR MOBILE MACHINES

BACKGROUND OF THE INVENTION

The present invention relates generally to a control device for reducing premature brake wear in mobile self propelled machines. In particular, the present invention is a brake actuated shift control for machines having a transmission with at least two ranges.

Mobile machines or vehicles, such as mobile trenchers, skid steer loaders, trucks, tractors and the like utilize braking systems to provide a braking action to restrict movement of the mobile machine. The braking action can be initiated by a variety of methods, including depressing a pedal, actuating an electrical switch, or moving a brake engagement lever. A conventional hydraulic brake system typically includes a brake actuation valve coupled to a brake actuation piston. The brake actuation piston moves a brake pad or brake shoe which in turn engages a brake disk or brake drum, respectively, coupled to a drive driving a wheel. The braking system generally includes a parking brake which, when engaged, with drive power disengaged, allows an operator to leave the mobile machine unattended.

An operator occasionally causes brake failure by "driving through the brake", or moving the machine during such time that the brake is engaged, if the braking force is insufficient to hold the brake drum or disc stationary with drive power engaged.

"Brake drive through" is most prevalent in situations where the transmission produces a high output torque and substantially overpowers the braking force such that the braking force is unnoticeable to the operator. Generally, the output torque applied by the transmission corresponds inversely to the drive range selected. For example, the lowest range available in the transmission would correspond to the highest output torque available by the transmission. This is also true when the vehicle has a multiple range fluid actuated transmission such as, for example, a hydrostatic transmission.

A hydrostatic transmission includes a pump section which is driven by an engine of the vehicle to transmit hydraulic fluid under pressure through hydraulic circuitry to a motor section of the hydrostatic transmission. The motor section drives the vehicle wheels. The ground speed of the machine is determined by the volume of oil supplied to the motor section within a given period of time.

Selectable ranges or speeds in hydrostatic transmissions allow the operator to select an appropriate maximum speed for a particular application. A range which provides for a higher maximum speed than another range results in an overall reduction of available output torque in a manner analogous to the speed/torque characteristics of a conventional manual transmission. For example, fourth gear in a four speed manual transmission provides the fastest vehicle speeds, however, the same vehicle cannot easily be set in motion when the transmission is in fourth gear due to the reduced available output torque.

Brake actuated indicator lamps, bells, buzzers or the like, are used as warnings to reduce brake drive through. However, such an indicator is only partially successful in reducing premature brake wear since the lamp can burn out, the view of the lamp may be obscured by dust or glare from the sun, or the operator may disregard the indicator lamp entirely. The possibility of "brake drive through" can be further reduced by shifting the transmission into neutral so that the transmission does not supply an output torque to a drive wheel.

SUMMARY OF THE INVENTION

The present invention relates to a control device for reducing premature brake wear leading to brake failure in a mobile self propelled machine caused when a brake coupled to the machine is engaged and, during brake engagement, a transmission of the machine transmits power to a coupled drive wheel engaging a surface. A transmission shift or range actuation device is coupled to the transmission. The transmission or range selector has at least two selectable ranges, corresponding inversely to a plurality of transmission output torques. A device responsive to brake actuation is coupled to the shift or range actuation device for causing the transmission operated in a lower range to shift to a higher range when the brake is applied so as to reduce the transmission output torque. Specifically, the mobile machine shown is a low ground speed, earth working, machine.

DETAILED DESCRIPTION OF THE PREFERRED EMBODIMENTS

Figure 1:
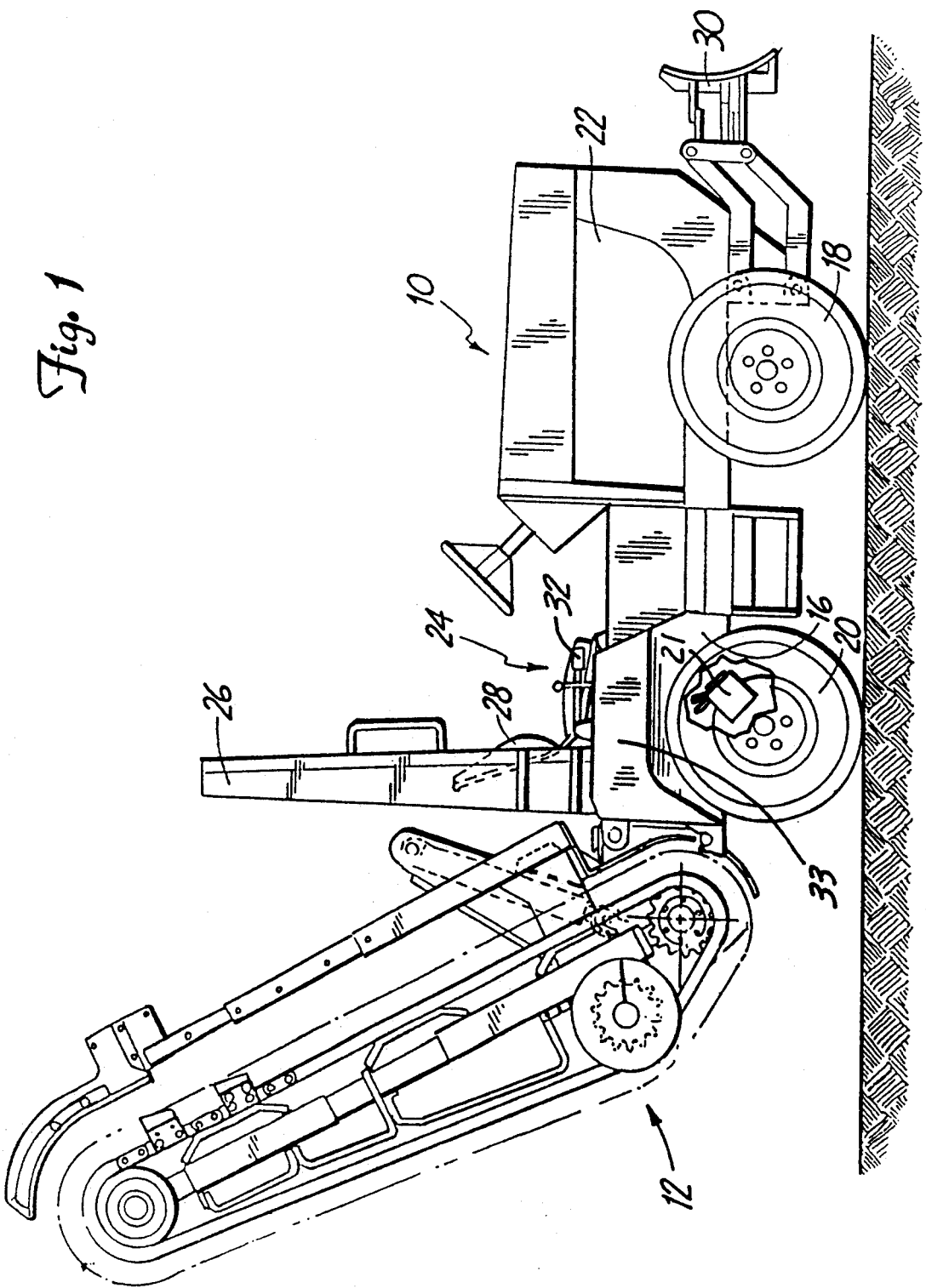
FIG. 1 is an illustration of a trencher having a shift control made in accordance with the present invention with a trenching boom assembly held in a raised travel position; and FIG. is electro-hydraulic schematic representation showing the present invention.

A mobile self propelled machine 10, as shown a trencher, is illustrated generally in FIG. 1. As shown, trencher 10 is a conventional hydrostatic drive four wheel, prime mover, having a frame 16 supported for over-the-ground travel by a pair of front wheels 18 and a pair of rear wheels 20. A brake 21, when actuated, brakes the rotation of wheels 18 and 20. An engine and hydrostatic pump (not separately shown) are mounted to frame 16 in engine compartment 22 toward the front of trencher 10. An operator controls mobile trencher 10 and trenching attachment 12 from an operator's compartment 24 which is positioned behind engine compartment 22. Trencher 10 also includes a rollover protective structure 26 adjacent seat 28 at the rear of the frame, and an attachment such as a backfill blade 30 mounted to the front of the trencher 10.

A brake actuation lever 32 is pivotally mounted to a rear portion of an upper surface of a substantially horizontal plate forming an upper portion of right fender 33. Brake actuation lever 32, when engaged, operates brake 21 to brake movement of trencher 10. The brake actuation lever 32 is in the engaged position in a vertical position and brake 21 is disengaged when it is moved to a somewhat horizontal position substantially parallel to the upper portion of right fender 33.

Figure 2:
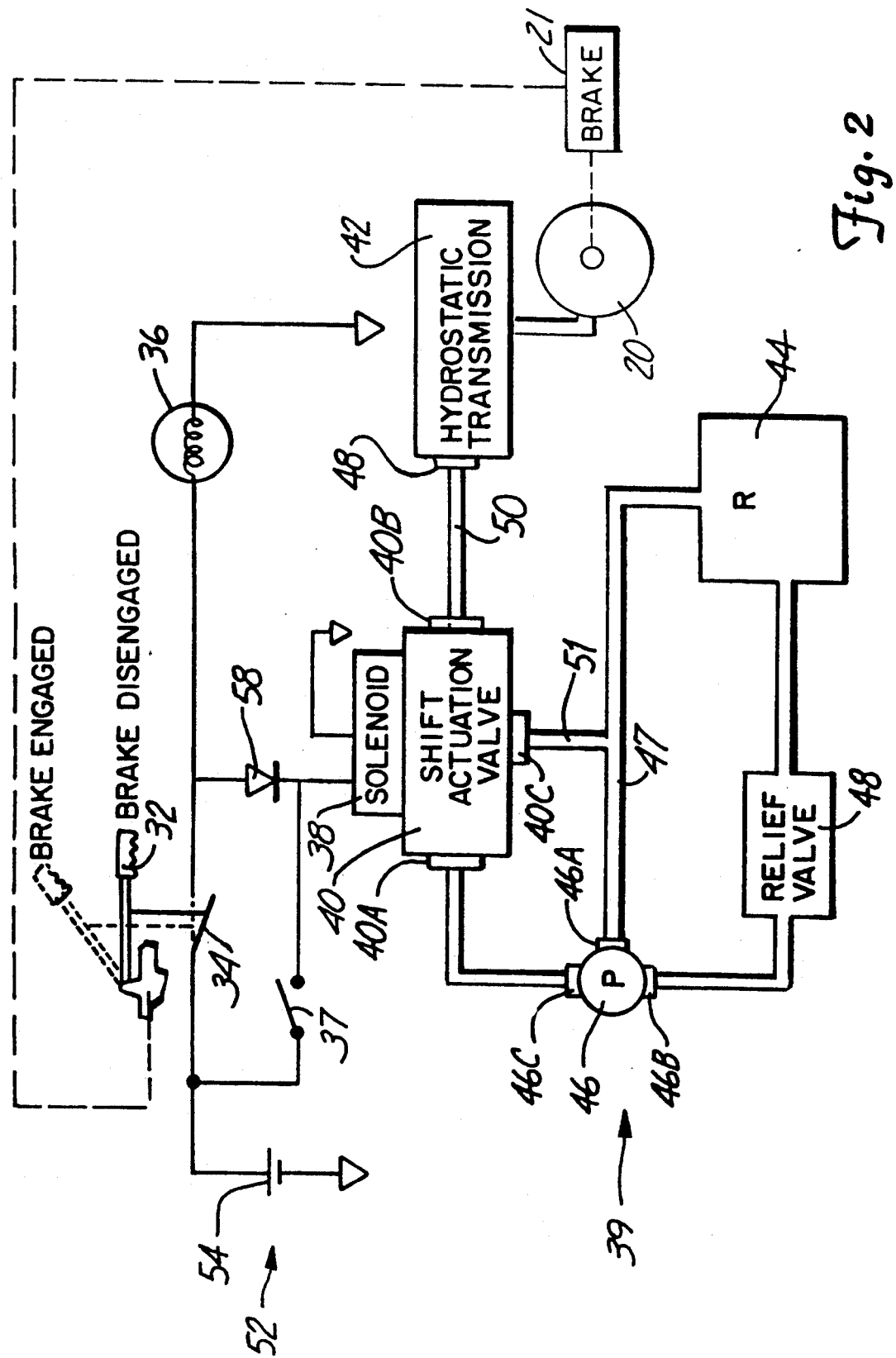

While in the engaged position, brake actuation lever 32 closes the contacts in brake actuation lever switch 34, energizing an instrument panel warning lamp 36 and, assuming the operator control switch 37 is in the low range position, in the present invention, simultaneously energizing shift actuation valve solenoid 38 as shown in FIG. 2. In the machine shown, the transmission is a two range transmission. The operator control switch 37 provides operator selection of either high or low range. High range is selected when operator control switch 37 contacts are closed. Low range is selected when operator control switch 37 contacts are open. Most of the operation is in the low range when the trencher is working. Shift actuation solenoid 38, mechanically coupled to shift actuation valve 40, operates (energizes) the shift actuation valve to cause hydrostatic transmission 42 to shift to a higher range of two ranges as shown, thereby reducing the hydrostatic transmission output torque. When the valve 40 is not actuated the hydrostatic transmission returns to low range.

While in the disengaged position, brake actuation lever 32 causes the contacts in brake actuation lever switch 34 to open, de-energizing the instrument panel warning lamp 36 and simultaneously opening the circuit through switch 34 to shift actuation valve solenoid 38. Therefore, hydrostatic transmission 42 shifts to the lower range of the two ranges, if operator switch 37 is positioned to select low range.

In FIG. 2, hydraulic circuit 39 includes a hydraulic reservoir 44 coupled to hydraulic pump input 46A of hydraulic pump 46 by hydraulic supply line 47 for supplying hydraulic fluid to hydraulic pump 46. Bypass port 46B of hydraulic pump 46 is coupled in a hydraulic circuit to reservoir 44 through relief valve 48. Hydraulic pump output 46C of hydraulic pump 46 is coupled to shift actuation valve input port 40A. A first shift actuation valve output port 40B is coupled to the transmission shift control port 48 of hydrostatic transmission 42 by transmission shift control line 50. A second shift actuation valve output port 40C is coupled between hydraulic reservoir 44 and hydraulic pump 46, and a transmission shift bypass line 51 is coupled to hydraulic supply line 47.

Shift actuation valve 40 is an electrically actuated spring return hydraulic spool valve having an electrical shift actuation valve solenoid 38 coupled thereto. When shift actuation valve solenoid 38 is de-energized, shift actuation valve 40 is closed to prevent oil flow to transmission shift control port 48 of hydrostatic transmission 42, resulting in the selection of a low range of two possible ranges, as shown. During this time, the hydraulic fluid flow is blocked and no flow occurs. Energizing solenoid 38 causes shift actuation valve 40 to open thereby allowing hydraulic pump 46 to provide hydraulic fluid under pressure to transmission shift port 48 of hydrostatic transmission 42, thereby selecting the higher of the two ranges of the hydrostatic transmission 42.

De-energizing solenoid 38 allows the spring to close shift actuation valve 40, again blocking fluid flow from the pump. During this time, oil is allowed to flow from transmission shift port 48 of hydrostatic transmission 42 through transmission shift by pass line 51 to either hydraulic reservoir 44 or hydraulic pump input 46A.

FIG. 2 also shows an electrical circuit 52 coupled to the shift actuation valve solenoid 38 of hydraulic circuit 39. A negative terminal of battery 54 is coupled to ground. The positive terminal of battery 54 is electrically coupled to an input of brake actuation lever switch 34, brake actuation lever switch 34 being actuated when brake actuation lever 32 is moved to the engaged position. An output of brake actuation lever 65 switch 34 is coupled to an instrument panel warning lamp 36 and to a first terminal of shift actuation valve solenoid 38 through a diode 58. A second terminal of shift actuation valve solenoid 38 is coupled to ground. A first terminal of operator control switch 37 is coupled to the positive terminal of battery 54 and a second terminal of operator control switch 37 is coupled to solenoid 38.

Placing brake actuation lever 32 in the engaged position closes brake actuation lever switch 34, thereby causing battery 54 to supply electrical current through diode 58 to shift actuation valve solenoid 38, energizing solenoid 38 and selecting the higher of the two ranges of the hydrostatic transmission. Placing the brake actuation lever 32 in the disengaged position opens brake actuation lever switch 34 to open this circuit path to solenoid 38, and if the operator control switch 37 is set for low range, the spring return of valve 40 causes the hydrostatic transmission 42 to shift to low range.

"Brake drive through" most generally occurs when a parking brake is engaged by placing the brake actuation lever in the engaged (park) position during a time when no rotational power is being applied to the drive wheels, but thereafter the transmission is shifted into a range and rotational power is transmitted to a drive wheel while the brake is applied. Brake drive through possibly also can occur if a brake is applied while the vehicle is being driven under power.

In either case, the present invention provides a control system such that when the brake actuation lever 32 is moved to the engaged position and the brake actuated, hydrostatic transmission 42 will be shifted into a high range resulting in a lower hydrostatic transmission output torque. The actuated brake will then have sufficient holding force to either stall the engine or cause a relief valve in the hydrostatic transmission pump to open. Some hydrostatic transmissions have several ranges and the actuation of the brake will usually result in shifting to the highest range when incorporating the present invention. The transmission may be manual coupled with a power operated range selector that can be operated in response to the brake "on" signal.

The present invention provides a brake actuated shift control for preventing "brake drive through", thereby reducing premature brake wear leading to brake failure. The brake actuated shift control is simple to construct, and is operated simply by moving the brake engagement lever to the engaged position.

Although the present invention has been described with reference to preferred embodiments, workers skilled in the art will recognize that changes may be made in form and detail without departing from the spirit and scope of the invention.

What is claimed is:

1. Control means for reducing premature brake wear in a mobile machine having a hydrostatic transmission coupled to the mobile machine for transmitting rotational power to a coupled drive wheel engaging a surface, and which has a power operated shift between high and low transmission ranges comprising:

transmission shift actuation means coupled to the power operated shift of the hydrostatic transmission, the transmission having high and low ranges corresponding inversely to high and low transmission output torques; and parking brake means responsive to parking brake actuation coupled to the transmission shift actuation means for causing the transmission when operated in the low range as the parking brake is applied to shift directly to high range when the parking brake is applied so as to reduce the transmission output torque when the parking brake is applied without shifting to a nondrive condition.

2. The apparatus of claim 1 wherein the transmission shift actuation means includes an electrically actuated hydraulic valve.

3. The apparatus of claim 1 wherein the brake actuation means includes a brake actuation lever.

4. The apparatus of claim 3 wherein a brake actuation lever switch operates when the brake actuation lever moves to an actuated position, the electrically actuated hydraulic valve being coupled to a brake actuation lever switch which in turn is coupled to the brake actuation lever.

5. A mobile self-propelled machine having a vehicle parking brake means adapted for use in conjunction with control means for reducing premature brake wear leading to brake failure, caused when a parking brake is substantially engaged and, wherein during such brake engagement, a mobile machine drive transmits rotational power to at least one drive wheel engaging a surface, comprising:
  an operator compartment;
  an engine;
  a hydrostatic transmission coupled to the engine, the hydrostatic transmission having a transmission output and the transmission having a plurality of selectable ranges corresponding inversely to a plurality of transmission output torques selectable upon actuation of transmission shift actuation valve means, the transmission output being coupled to at least one drive wheel, the transmission shift actuation valve means being coupled in a hydraulic circuit for causing the fluid actuated transmission operated in a lower drive range to shift directly to a higher drive range when the parking brake means is actuated to reduce the transmission output torque relative to input torque; and
  the parking brake means providing a braking action to restrict mobile machine movement when the parking brake means is applied, the parking brake means being coupled to the transmission shift actuation valve means for actuating the valve means when the parking brake means is applied.

6. The apparatus of claim 5 wherein the transmission shift actuation valve means comprises an electrically actuated solenoid coupled to a hydraulic valve.

7. The apparatus of claim 6 wherein the brake means comprises a brake coupled to a brake actuation lever, and a brake actuation lever switch coupled to the brake actuation lever and to the solenoid.

* * * * *